(12) United States Patent
Konda et al.

(10) Patent No.: US 7,234,101 B1
(45) Date of Patent: Jun. 19, 2007

(54) METHOD AND SYSTEM FOR PROVIDING DATA INTEGRITY IN STORAGE SYSTEMS

(75) Inventors: Dharma R. Konda, Aliso Viejo, CA (US); Kathy K. Caballero, Huntingdon Beach, CA (US); Sanjaya Anand, Coto de Caza, CA (US); Ashish Bhargava, Irvine, CA (US); Rajendra R. Gandhi, Laguna Niguel, CA (US); Kuangfu David Chu, Irvine, CA (US); Cam Le, Irvine, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 534 days.

(21) Appl. No.: 10/674,943

(22) Filed: Sep. 30, 2003

Related U.S. Application Data

(60) Provisional application No. 60/498,384, filed on Aug. 27, 2003.

(51) Int. Cl.
*G06F 11/00* (2006.01)
(52) U.S. Cl. .................... 714/798; 714/776; 714/89
(58) Field of Classification Search ................ 714/798, 714/6, 52, 776, 819; 710/8, 313
See application file for complete search history.

(56) References Cited

U.S. PATENT DOCUMENTS

| | | | |
|---|---|---|---|
| 4,268,906 A | 5/1981 | Bourke et al. |
| 4,333,143 A | 6/1982 | Calder |
| 4,449,182 A | 5/1984 | Rubinson |
| 4,549,263 A | 10/1985 | Calder |
| 4,777,595 A | 10/1988 | Strecker et al. |
| 4,783,730 A | 11/1988 | Fischer |
| 4,783,739 A | 11/1988 | Calder |
| 4,803,622 A | 2/1989 | Bain, Jr. et al. |
| 5,129,064 A | 7/1992 | Fogg, Jr. et al. |
| 5,212,795 A | 5/1993 | Hendry |
| 5,249,279 A | 9/1993 | Schmenk et al. |
| 5,276,807 A | 1/1994 | Kodama et al. |
| 5,321,816 A | 6/1994 | Rogan et al. |
| 5,347,638 A | 9/1994 | Desai et al. |

(Continued)

FOREIGN PATENT DOCUMENTS

EP  0738978  10/1996

(Continued)

*Primary Examiner*—Guy Lamarre
*Assistant Examiner*—Fritz Alphonse
(74) *Attorney, Agent, or Firm*—Klein, O'Neill & Singh, LLP

(57) ABSTRACT

A method and system for performing data integrity process is provided. The method includes selecting a cyclic redundancy code ("CRC") mode from amongst append, validate and keep, and validate and remove mode. If the append mode is selected, then CRC is appended after each data block boundary. A CRC seed value is incremented for each data block providing a unique CRC value for each data block. If validate and keep mode is selected, then CRC accompanying any data is compared to CRC that may have been accumulated. If validate and remove mode is selected, then CRC is first validated and then CRC is removed before data is sent out. The system includes CRC logic that allows firmware running on an adapter to select one of plural CRC modes including append, validate and keep, and validate and remove mode.

19 Claims, 15 Drawing Sheets

SYSTEM BLOCK DIAGRAM

U.S. PATENT DOCUMENTS

| | | | |
|---|---|---|---|
| 5,371,861 A | 12/1994 | Keener et al. | |
| 5,448,702 A | 9/1995 | Garcia, Jr. et al. | |
| 5,469,453 A * | 11/1995 | Glider et al. | 714/6 |
| 5,568,614 A | 10/1996 | Mendelson et al. | 709/231 |
| 5,647,057 A | 7/1997 | Roden et al. | |
| 5,671,365 A | 9/1997 | Binford et al. | |
| 5,740,467 A | 4/1998 | Chmielecki, Jr. et al. | |
| 5,758,187 A | 5/1998 | Young | |
| 5,761,427 A | 6/1998 | Shah et al. | |
| 5,828,903 A | 10/1998 | Sethuram et al. | |
| 5,875,343 A | 2/1999 | Binford et al. | |
| 5,881,296 A | 3/1999 | Williams et al. | |
| 5,892,969 A | 4/1999 | Young | |
| 5,905,905 A | 5/1999 | Dailey et al. | |
| 5,917,723 A | 6/1999 | Binford | 700/2 |
| 5,968,143 A | 10/1999 | Chisholm et al. | |
| 5,983,292 A | 11/1999 | Nordstrom et al. | |
| 6,006,340 A | 12/1999 | O'Connell | |
| 6,049,802 A | 4/2000 | Waggener, Jr. et al. | |
| 6,055,603 A | 4/2000 | Ofer et al. | |
| 6,078,970 A | 6/2000 | Nordstrom et al. | |
| 6,085,277 A | 7/2000 | Nordstrom et al. | |
| 6,115,761 A | 9/2000 | Daniel et al. | |
| 6,138,176 A | 10/2000 | McDonald et al. | |
| 6,185,620 B1 | 2/2001 | Weber et al. | 709/230 |
| 6,233,244 B1 | 5/2001 | Runaldue et al. | |
| 6,269,413 B1 | 7/2001 | Sherlock | |
| 6,434,630 B1 | 8/2002 | Micalizzi, Jr. et al. | |
| 6,457,098 B1 | 9/2002 | Young | 710/313 |
| 6,463,032 B1 | 10/2002 | Lau et al. | |
| 6,502,189 B1 | 12/2002 | Westby | 713/1 |
| 6,504,846 B1 | 1/2003 | Yu et al. | |
| 6,546,010 B1 | 4/2003 | Merchant et al. | |
| 6,564,271 B2 | 5/2003 | Micalizzi, Jr. et al. | |
| 6,604,224 B1 * | 8/2003 | Armstrong et al. | 714/819 |
| 6,671,776 B1 * | 12/2003 | DeKoning | 711/114 |
| 6,671,832 B1 * | 12/2003 | Apisdorf | 714/52 |
| 6,721,799 B1 | 4/2004 | Silvkoff | 709/236 |
| 6,763,398 B2 * | 7/2004 | Brant et al. | 710/8 |
| 6,775,693 B1 | 8/2004 | Adams | |
| 6,810,440 B2 | 10/2004 | Micalizzi, Jr. et al. | |
| 6,810,442 B1 | 10/2004 | Lin et al. | |
| 2002/0069317 A1 * | 6/2002 | Chow et al. | 711/104 |
| 2003/0097481 A1 * | 5/2003 | Richter | 709/251 |
| 2003/0126320 A1 | 7/2003 | Liu et al. | |
| 2004/0073862 A1 * | 4/2004 | Armstrong et al. | 714/776 |

FOREIGN PATENT DOCUMENTS

| | | |
|---|---|---|
| EP | 1059588 | 12/2000 |
| WO | WO 95/06286 | 3/1995 |
| WO | WO 00/58843 | 10/2000 |

* cited by examiner

SYSTEM BLOCK DIAGRAM

Receive DMA Register Map

| RISC Address (h) | SEQ Address (h) | Register Name | Description |
|---|---|---|---|
| 320<br>321<br>322<br>323 | 20<br>21<br>22<br>23 | RDMA Address Counter 0<br>RDMA Address Counter 1<br>RDMA Address Counter 2<br>RDMA Address Counter 3 | These registers reflect the current PCI address. They function as a 64-bit up counter, incrementing for each byte transferred across the PCI bus. This includes the CRC protection bytes. |
| 324<br>325 | 24<br>25 | RDMA Transfer Counter 0<br>RDMA Transfer Counter 1 | These registers reflect the number of bytes remaining to be transferred across the PCI bus for a segment. This includes the CRC protection bytes. |
| 326<br>327 | 26<br>27 | RDMA Byte Counter 0<br>RDMA Byte Counter 1 | These registers reflect the number of bytes remaining to be transferred across the PCI bus in the total RDMA transfer. This includes the CRC protection bytes. |
| 328<br>329 | 28<br>29 | RDMA Relative Offset 0<br>RDMA Relative Offset 1 | These registers reflect the number of bytes received from the RD FIFO 412. This includes the CRC bytes in Validate_And_Keep mode. This does not include the CRC bytes in Append mode. |
| 32A | 2A | RDMA Control | Bit 14 : Reserved<br>Bit 11-10 : Reserved<br>Bit 6 : CRC Enable<br>Bit 5 : CRC Register Select |

FIGURE 7A-1

| | | | |
|---|---|---|---|
| 32B | 2B | RDMA Status | Bit 8 PCI Bus Error: Change in functionality. OR in Error conditions for CRC Error and Info Data Error. |
| 32C<br>32D<br>32E<br>32F | 2C<br>2D<br>2E<br>2F | RDMA Frame Counter<br>RDMA Payload Byte Cntr<br>RDS Low<br>RDS High/ Error Enable | |

The following values are multiplexed with DMA counters and are selectable by RDMA control register bit (e.g.5 ,in this case):

| | | | |
|---|---|---|---|
| 320<br>321 | 20<br>21 | RDMA CRC Accumulator 0<br>RDMA CRC Accumulator 1 | The firmware writes these registers when starting a RDMA transfer. The firmware reads this register on a context switch. The value read is restored when the context resumes.<br><br>If the data transfer stops after CRC for Block 0 and before data for Block 1, these registers read back the CRC Seed Reload value for Block1.<br><br>If the data transfer stops after data for Block 0 but before CRC for block 0, these registers read back CRC Value for Block 0. |
| 322<br>323 | 22<br>23 | CRC Seed Reload 0<br>CRC Seed Reload 1 | These registers contain the CRC Seed Reload Value for the block being transferred.<br><br>If the data transfer stops after CRC for Block 0 and before data for Block !, these registers read back CRC Seed Reload Value for Block 1. |

FIGURE 7A-2

| | | | If the data transfer stops after data for Block 0 but before CRC for Block 0, these registers read back CRC Seed Reload Value for Block 1. Once data transfer for Block 0 is done, there is no need to keep seed for Block 0. The next block transfer needs seed for block 1. |
|---|---|---|---|
| 324 | 24 | Block Byte Offset | This register contains the number of bytes remaining for a current block (down counter), and corresponds to the CRC Accumulator registers.<br><br>If the data transfer stops after CRC for Block 0 and before data for Block 1, this register will read back a value equal to Block Size.<br><br>If the data transfer stops after data for Block 0 but before CRC for Block 0, this register will read back a value of ZERO. |
| 325<br>326 | 25<br>26 | Info Data 0<br>Info Data 1 | These registers contain the Info Data 213 value for the block being transferred. If a context switch occurs on a block boundary, these registers should read back the Info Data 213 or the next block. |
| 327 | 27 | Disk CRC Configuration | This register contains the Disk CRC Configuration parameters.<br>Bit 15: Select Last Block CRC Value For Read<br>  0 : selects accumulator for current block<br>  1 : selects accumulator for last block<br>Bit 14:6 : Reserved<br>Bit 6 : Disable CRC Validation |

FIGURE 7A-3

| | | | |
|---|---|---|---|
| | | | Bit 5: Increment CRC Seed. If this bit is set, the CRC seed increments from block to block. If this bit is not set, the CRC seed will be constant.<br>Bit 4: Info Data Supported. If this bit is set Info Data 213 support is enabled. 8 bytes of protection data(CRC + Info Data) are appended to each block. If this bit is not set, only 4 bytes(CRC) are appended to each block.<br>Bit 3 : Increment Info Data. If this bit is set, the Info Data 213 is incremented from block to block. If this bit is not set, the info data will remain constant.<br>Bit 2 : Disable Info Data Validation. If this bit is set, the Info Data 213 is not validated. If this bit is reset, the 4 bytes of Info Data is compared against the expected value (maintained in the Info Data Registers).<br>Bit 1 : CRC Protection Mode (applicable only in Disk CRC mode, iSCSI always does append)<br>   0 : Append<br>   1 : Validate and Keep<br>Bit 0 : CRC Mode Select<br>   0 : Disk CRC<br>   1 : iSCSI CRC |
| 328 | 28 | Disk Block Size | Bits 15-12 : Reserved<br>Bits 11-0 : Block Size(Bits1:0 can be ignored).Supported block sizes are from 4 bytes to 0xFFC bytes. |

FIGURE 7A-4

| | | | |
|---|---|---|---|
| 329-32A | 29-2A | Reserved | |
| 32B | 2B | CRC STATUS | Bits 15-2 : Reserved<br>Bits 1 : CRC Error (Validate And Keep mode only)<br>Bits 0 : Info Data Error (Validate And Keep mode only)<br>PCI Bus Error, bit 8 in DMA Status register is also set to 1 when any of the error status bits in CRC Status register are set. |
| 32C-32F | 2C-2F | Reserved | |

FIGURE 7A-5

| RISC Address | SEQ Address | Register Name | Description |
|---|---|---|---|
| 90<br>91<br>92<br>93 | 20<br>21<br>22<br>23 | TDMA Address Counter 0<br>TDMA Address Counter 1<br>TDMA Address Counter 2<br>TDMA Address Counter 3 | These registers reflect the PCI address.<br>They function as a 64-bit up counter, incrementing for each byte transferred across the PCI bus. This includes the CRC protection bytes. |
| 94<br>95 | 24<br>25 | TDMA Transfer Counter 0<br>TDMA Transfer Counter 1 | These registers reflect the number of bytes remaining to be transferred across the PCI bus for a segment. This includes the CRC protection bytes. |
| 96 | 26 | TDMA byte Counter 0 | These registers reflect the number of bytes remaining |

FIGURE 7B-1 : TDMA Register Map

| 97 | 27 | TDMA byte Counter 1 | to be transferred across the PCI bus in the total TDMA transfer. This includes the CRC protection bytes. |
|---|---|---|---|
| 98 99 | 28 29 | TDMA Relative offset 0 TDMA Relative offset 1 | These registers reflect the number of bytes transferred to the TD FIFO. This includes the protection bytes in Validate_And_Keep mode. This does not include the protection bytes in Validate_And_Remove mode. |
| 9A | 2A | TDMA Control | Bit 14: Resvered<br>Bit 11-10: Resvered<br>Bit 6 :CRC Enable<br>Bit 5 :CRC Register seclect |
| 9B | 2B | TDMA Status | Bit 8 PCI Bus Error: Change in functionality. Or in Error conditions for CRC Error and Info Data Error;. |
| 9C 9D 9E 9F | 2C 2D 2E 2F | TDMA Frame Byte Counter TDMA Payload Byte Size Resvered Resvered | |

The following register values are multiplexed with DMA counters and are selectable via TDMA control register bit (for example, bit 5).

| 90 91 | 20 21 | TDMA CRC Accumulator 0 | The firmware writes these registers when starting a TDMA tranfer. |
|---|---|---|---|

FIGURE 7B-2

| | | | |
|---|---|---|---|
| | | TDMA CRC Accumulator 1 | If the data transfer stops after CRC for Block 0 and before data for Block 1, these registers read back the CRC Seed Reload Value for Block 1.<br><br>If the data transfer stops after data for Block 0 but before CRC for Block 0. These registers will read back CRC value for Block 0. |
| 92<br><br>93 | 22<br><br>23 | CRCSeed Reload 0<br>CRCSeed Reload 1 | These registers contain the CRC Seed Reload Value for the block being transferred.<br><br>If the data transfer stops after CRC for Block 0 and before data for Block 1, these registers read back CRC Seed Reload Value for Block 1.<br><br>If the data transfer stops after data for Block 0 but before CRC for Block 0, these registers read back CRC Seed Reload Value for Block 0. |
| 94 | 24 | Block byte offset | This register contains the number of bytes remaining for the current block (down counter), and corresponds to the CRC Accumulator registers.<br><br>If the data transfer stops after CRC for Block 0 and before data for Block 1, this register reads back a value equal to Block Size.<br><br>If the data transfer stops after data for Block 0 but before CRC for Block 0, this register reads back a value of ZERO. |

FIGURE 7B-3

| 95 | 25 | Info Data 0 | These registers contain the Info Data 213 value for the block being transferred. If a context switch occurs on a block boundary, these registers should read back the Info Data for the next block. |
|---|---|---|---|
| 96 | 26 | Info Data 1 | |
| 97 | 27 | Disk CRC configuration | This register contains the Disk CRC configuration parameters.<br>Bit 15: Selects last block CRC Value For Read<br>    0: selects accumulator for current block<br>    1: selects accumulator for last block.<br>Bit 14:7: Reserved<br>Bit 6: Disable CRC Validation<br>Bit 5: Increment CRC seed. If this bit is set, the CRC seed increments from block to block. If this bit not set, the CRC seed will be constant.<br>Bit 4: Info Data supported. If this bit is set, Info Data support is enabled. 8 bytes of protection data (CRC +Info Data) are validated on each block. If this bit not set, only 4 bytes (CRC) are validated on each block.<br>Bit 3: Increment Info Data, If this bit is set, the Info Data 213 increments from block to block. If this bit is not set, the Info data will remain constant.<br>Bit 2: Disable Info Data Validation. If this bit is set, the Info Data |

FIGURE 7B-4

| | | | |
|---|---|---|---|
| | | | 213 is not validated. If this bit is reset, the 4 bytes of Info Data 213 are compared against the expected value (maintained in the Info Data registers).<br>Bit 1: CRC Protection Mode (applicable only in Disk CRC mode iSCSI always does Validate And Remove)<br>   0 : Validate And Remove<br>   1 : Validate And Keep<br>Bit 0 : CRC Mode Select<br>   0 : Disk CRC<br>   1 : iSCSI CRC |
| 98 | 28 | Disk Block Size | Bits 15-12 : Reserved<br>Bits 11-0 : Block Size (Bits 1:0 can be ignored.) Supported Block sizes are from 4 bytes to 0xFFC byte |
| 99-9A | 29-2A | Reserved | |
| 9B | 2B | CRC Status | Bits 15-2 : Reserved<br>Bits 1 : CRC Error<br>Bits 0 : Info Data Error<br><br>Note : PCI Bus Error, bit 8 in DMA Status register is also set to 1 when any of the error status bits in CRC Status register are set.) |
| 9C-9F | 9C-9F | Reserved | |

FIGURE 7B-5

METHOD AND SYSTEM FOR PROVIDING DATA INTEGRITY IN STORAGE SYSTEMS

CROSS REFERENCE TO RELATED APPLICATIONS

This application claims priority claim under 35 U.S.C.§ 119(e)(1) to the provisional patent application filed on Aug. 27, 2003, Ser. No. 60/498,384, entitled "METHOD AND SYSTEM FOR PROVIDING DATA INTEGRITY IN STORAGE SYSTEMS", the disclosure of which is incorporated herein by reference in its entirety.

BACKGROUND

1. Field of the Invention

The present invention relates to storage systems, and more particularly, to maintaining data integrity in storage systems.

2. Background of the Invention

Conventional storage systems (disk drive etc.) store data bytes in sets of predetermined length. Disk array storage systems have multiple storage disk drive devices that are arranged and managed as a single mass storage system. Redundancy is often used to aid data availability, where data or data relationship is stored in multiple locations. In the event of a failure, redundant data is retrieved from the operable portion of a system and used to regenerate the lost data. A RAID (Redundant Array of Independent Disks) storage system is one such system that uses a part of the physical storage capacity to store redundant data.

Data is typically moved from plural host systems (that include computer systems, and embedded devices etc.) to the storage system through a RAID controller.

Various standard interfaces are used to move data from host systems to storage devices. Fibre channel is one such standard. Fibre channel (incorporated herein by reference in its entirety) is an American National Standard Institute (ANSI) set of standards which provides a serial transmission protocol for storage and network protocols such as HIPPI, SCSI, IP, ATM and others. Fibre channel provides an input/output interface to meet the requirements of both channel and network users.

Host systems often communicate via a host bus adapter ("HBA") using the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is a standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

The iSCSI standard (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners. A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP/IP networks. iSCSI defines mapping of the SCSI protocol with TCP/IP.

The iSCSI architecture is based on a client/server model. Typically, the client is a host system such as a file server that issues a read or write command. The server may be a disk array that responds to the client request.

When data is moved to/from host systems to/from disk storage systems at high data rates, (e.g., 2 GBps), it is essential to maintain data integrity to take advantage of the high bandwidth that is offered by current industry standards.

Cyclic redundancy check ("CRC") is one way to maintain and validate data integrity. CRC bytes are generated and stored for each data set. CRC involves a process that operates on a block of data and generates a number (called checksum) that represents the content and organization of the data block. CRC is performed on data so that by comparing the checksum of a block of data to the checksum of another block of data, an exact match can be found. CRC is performed when data files are transferred from one location to another (host to storage/storage to host).

CRC calculations themselves are well known in the art. However, conventional techniques do not provide complete data integrity via CRC because often CRC is performed either too late or too early in the data transfer process.

Therefore, there is a need for a system and method that can provide data integrity for modern storage systems that are operating in high band-width environment.

SUMMARY OF THE INVENTION

In one aspect of the present invention, a method for performing data integrity process is provided. The process includes selecting a cyclic redundancy code ("CRC") mode from amongst append, validate and keep, and validate and remove mode.

If the append mode is selected, then CRC is appended after each data block boundary. A CRC seed value is incremented for each data block providing a unique CRC value for each data block.

If validate and keep mode is selected, then CRC accompanying any data is compared to CRC that may have been accumulated and if an error occurs after the comparison, an interrupt is generated.

If validate and remove mode is selected, then CRC is first validated and then CRC is removed before data is sent out.

In yet another aspect, a system for performing data integrity process is provided. The system includes CRC logic that allows firmware running on an adapter to select one of plural CRC modes including append, validate and keep, and validate and remove mode.

During append mode, a CRC engine determines the CRC for each data block and CRC seed value is incremented for each data block such that each data block has a unique CRC value. Also, each data block has a CRC value and an optional field where custom information may be added ("info data").

During the validate and keep mode, the CRC engine compares CRC for the data with accumulated CRC information and CRC is sent out with data.

During the validate and remove mode, the CRC engine compares CRC for the data with accumulated CRC information and CRC information is removed before data is sent out.

In yet another aspect, an adapter in a RAID controller that is coupled to a host on one side and a storage media on another side is provided. The adapter includes CRC logic that can perform data integrity process using one of plural CRC modes including append, validate and keep, and validate and remove mode. The CRC logic is functionally coupled to a PCI and/or PCI-X interface.

In one aspect of the present invention, data integrity is maintained through out the data path.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 7A-7B show various register values that are used to perform data integrity tests, according to one aspect of the present invention.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

It is noteworthy that a host system, as referred to herein, may include a computer, server or other similar devices, which may be coupled to storage systems. Host system includes a host processor, memory, random access memory ("RAM"), and read only memory ("ROM"), and other components.

Figure 1:
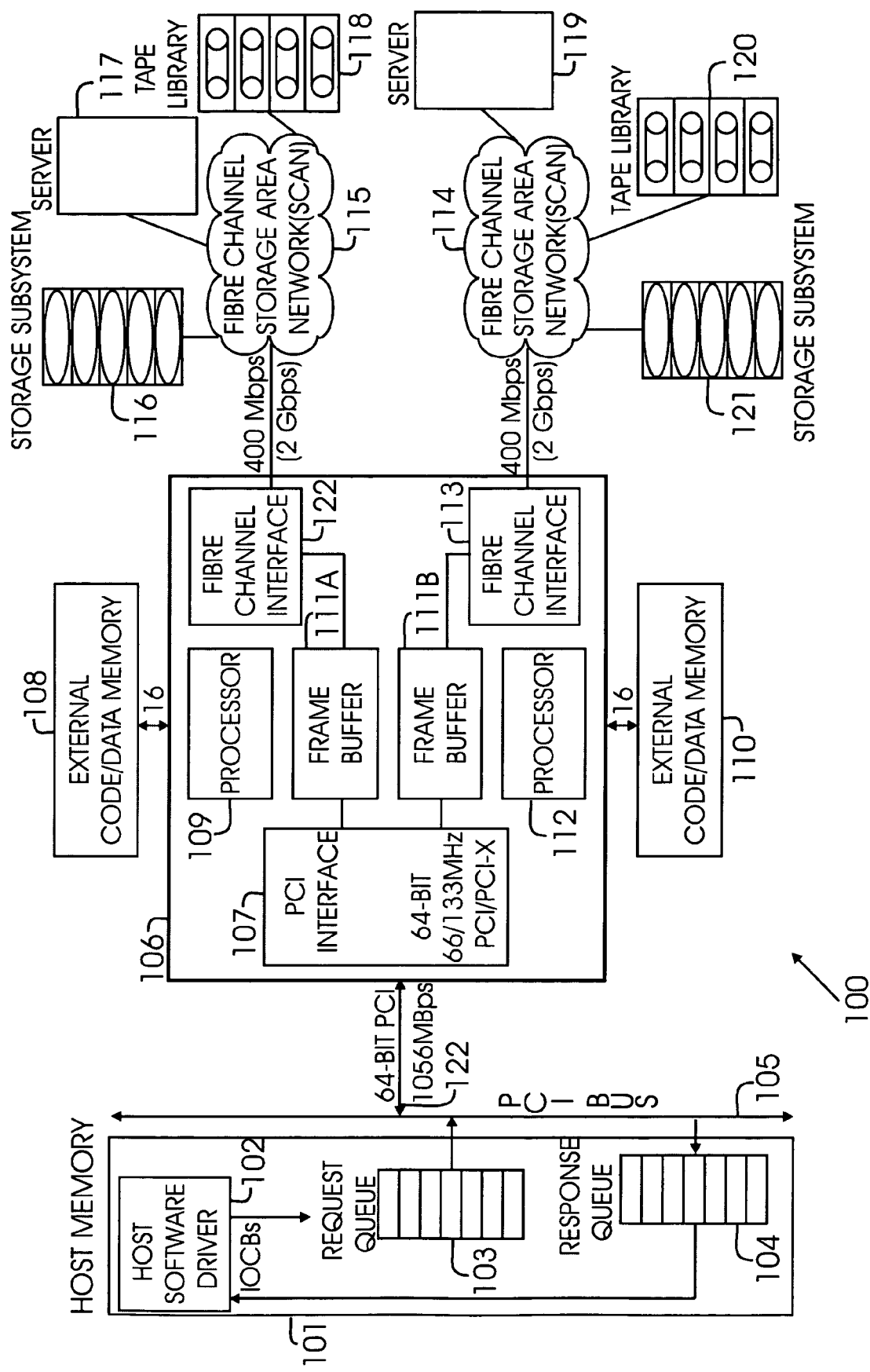
FIG. 1 shows a system with an adapter, according to one aspect of the present invention.

FIG. 1 shows a system 100 that uses a controller/adapter 106 (referred to as "adapter 106") for communication between a host system (not shown) with host memory 101 to various storage systems (for example, storage subsystem 116 and 121, tape library 118 and 120) using fibre channel storage area networks 114 and 116.

Host system communicates with adapter 106 via a PCI bus 105 through a PCI interface 107. Adapter 106 includes processors 112 and 109 for the receive and transmit side, respectively. Processor 109 and 112 may be a RISC processor.

Transmit path in this context means data coming from host memory 101 to the storage systems via adapter 106. Receive path means data coming from storage subsystem via adapter 106. It is noteworthy, that only one processor can be used for receive and transmit paths, and the present invention is not limited to any particular number/type of processors.

Processors 109/112 also include receive side/transmit side sequencers (referred to "SEQ").

Adapter 106 also includes fibre channel interface (also referred to as fibre channel protocol manager "FPM") 122 and 113 in receive and transmit paths, respectively. FPM 122 and 113 allow data to move to/from storage systems 116, 118, 120 and 121.

Figure 2A:
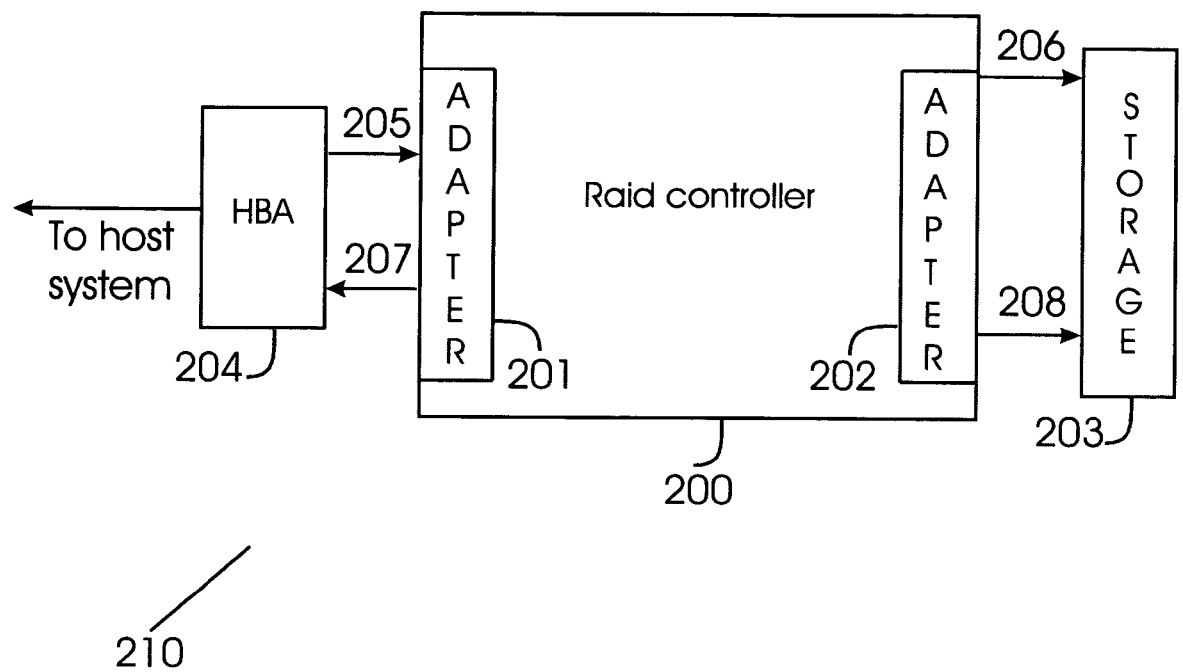
FIG. 2A shows an adapter as used in a RAID controller, according to one aspect of the present invention.

FIG. 2A shows a block diagram of a system using RAID controller 200 coupled to HBA 204 via adapter 201 and storage system 203 via adapter 202. Data 205 is sent to storage 203 via adapters 201 and 202.

The receive path is shown as 208 and 207, where data moves from storage 203 via adapters 202 and 201 to HBA 204, and the transmit path is shown as 205 and 206.

In one aspect of the present invention, data integrity is maintained through out the data path.

Figure 2B:
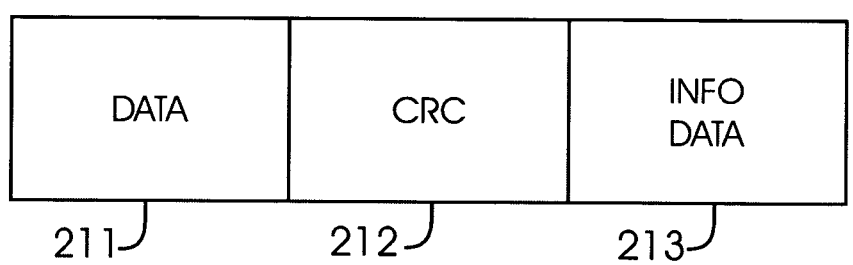
FIG. 2B shows a format used in the CRC process, according to one aspect of the present invention.

FIG. 2B shows a block diagram of data that is moved using system 210. Data 211 is followed by CRC bytes 212. An optional information field ("Info") data 213 is also provided, which allows a user of system 210 to include custom information. Data block 211 may be 512 bytes, CRC 212 is 4 bytes and info data 213 can be another 4 bytes. It is noteworthy that the various adaptive aspects of the present invention are not limited to any particular block size.

Figure 3:
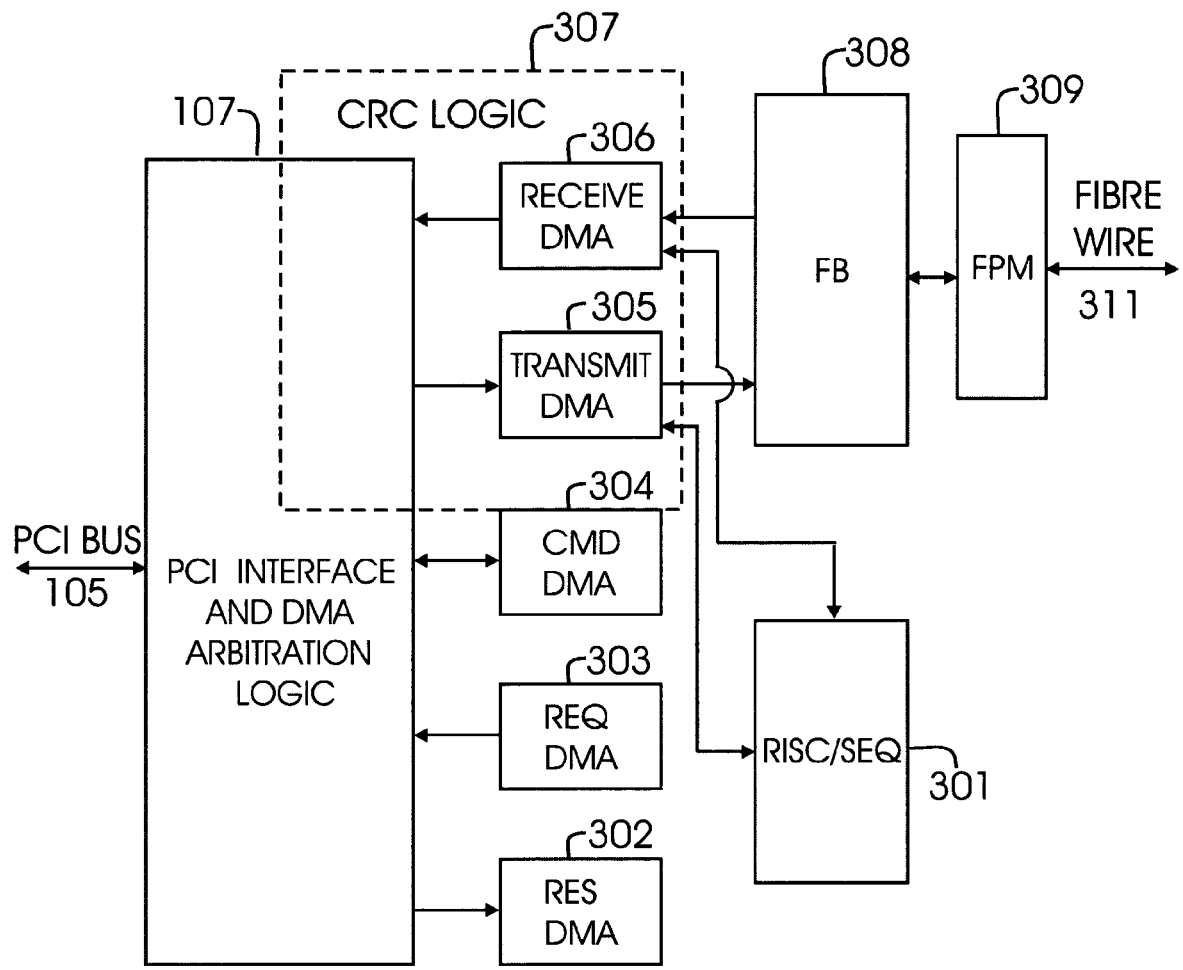
FIG. 3 is a block diagram of PCI interface components, according to one aspect of the present invention.

FIG. 3 is a block diagram showing PCI interface 107 components, as used in the adaptive aspects of the present invention. PCI interface 107 includes direct memory access ("DMA") and arbitration logic and is operationally coupled to PCI bus 105 at one end and to fibre channel wire 311 at the other end. Frame Buffer ("FB") 308 is used to store information, when data moves from a host to storage system and vice-versa.

PCI interface ("PCI I/F") 107 also includes CRC logic 307 that performs various operations, according to the adaptive aspects of the present invention, described below.

PCI I/F 107 is also coupled to a receive path DMA unit (RDMA) 306 and a transmit side DMA (TDMA) 305 that provides DMA access to move information back and forth in the transmit and receive paths.

PCI I/F 107 is also coupled to various other DMA units, for example, command DMA unit 304, request DMA unit 303 and response DMA unit 302. These DMA units allow the use of PCI I/F 107 to move information in and out of adapter 106 by using standard DMA techniques.

RDMA 306 and TDMA 305 modules use various register values to execute the adaptive aspects of the present invention, as described below and also shown in FIGS. 7A and 7B.

Figure 4:
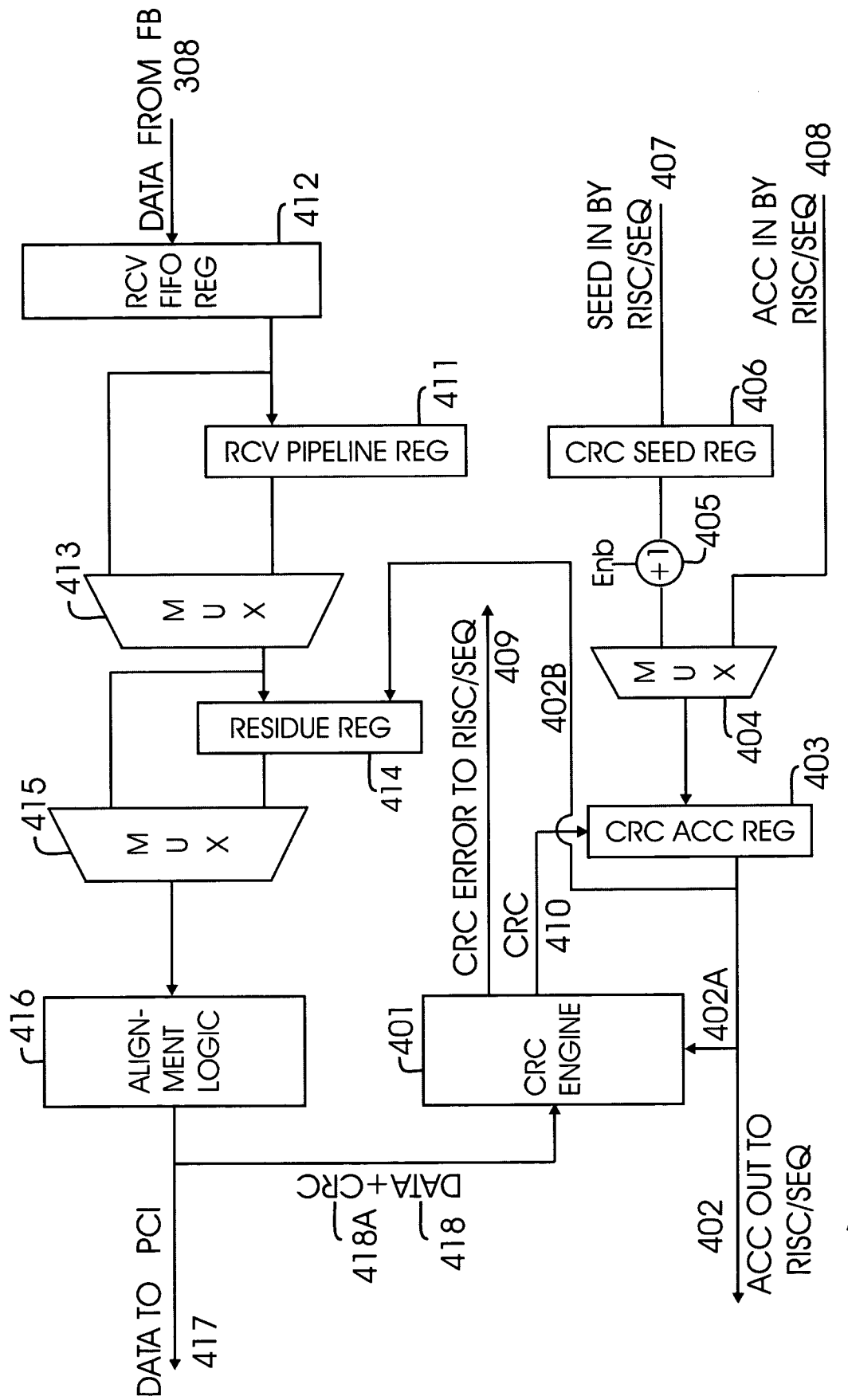
FIG. 4 shows a block diagram of a system performing data integrity checks in the receive path, according to one aspect of the present invention.

FIG. 4 shows a block diagram of system 400 that is incorporated in CRC logic 307 for the receive path. Data enters system 400 through FB 308 and is placed in a receive FIFO register (or storage) 412. Data is then sent to a multiplexor 413 (via receive pipeline register 411, if timing synchronization is needed).

Data is aligned by alignment logic 416, before being sent out to PCI bus 105.

In one aspect of the present invention, various modes may be used to implement data security techniques. The firmware running on processor 112 can select the CRC mode. In one aspect of the present invention, CRC may be implemented using an "append", "validate & keep" and "validate & remove" mode. A user of adapter 106 can use a particular mode depending on how adapter 106 is being used. The following describes the various modes, according to one aspect of the present invention:

"Append" Mode: In this mode, CRC is appended to data 308 before being sent out to PCI bus 105. In this case, CRC is calculated by CRC engine 401 after each data block. Processor 112 provides CRC seed. Every block of data has CRC seed value. In one aspect of the present invention, CRC seed value is incremented, using counter 405 and that provides a unique CRC for each data block. CRC seed value is provided by processor 112 for the receive path. Processor 112 also provides accumulated ("ACC") CRC values 408 for data stored in a storage system.

CRC engine 401 generates the CRC 410, which is sent to CRC ACC register 403. Accumulated CRC values 402 and 402A are sent to processor 112 and CRC engine 401 respectively. CRC error 409, if any, is sent to processor 112, while CRC 402B is sent out via residue register 414 and PCI bus 105.

In one aspect of the present invention, CRC seed 407 is incremented for each block of data ("Increment Mode", see FIGS. 7A and 7B). This allows the system to have a unique CRC for data block. In the increment mode, CRC 212 and info data 213 follow the data together. CRC seed increments after each block of data.

"Validate and Keep Mode": During this mode, data 417 is sent via PCI bus 105 and CRC 418A is sent to CRC engine 401. CRC engine 401 compares CRC 418A with the CRC that it has accumulated in register 403, in real time while data 417 is moving out to PCI bus 105. If there is an error, an interrupt is sent to processor 109/112. During this mode, CRC from the storage system is also sent to PCI bus 105.

"Validate and Remove Mode": In this case, data comes from FB 308 and is validated, as described above. After the validation, CRC is removed and only data is sent to the host. Hence, the host and the storage systems are not involved in the data integrity process. If any errors occur then they are reported to RISC/Seq 301.

Figure 5:
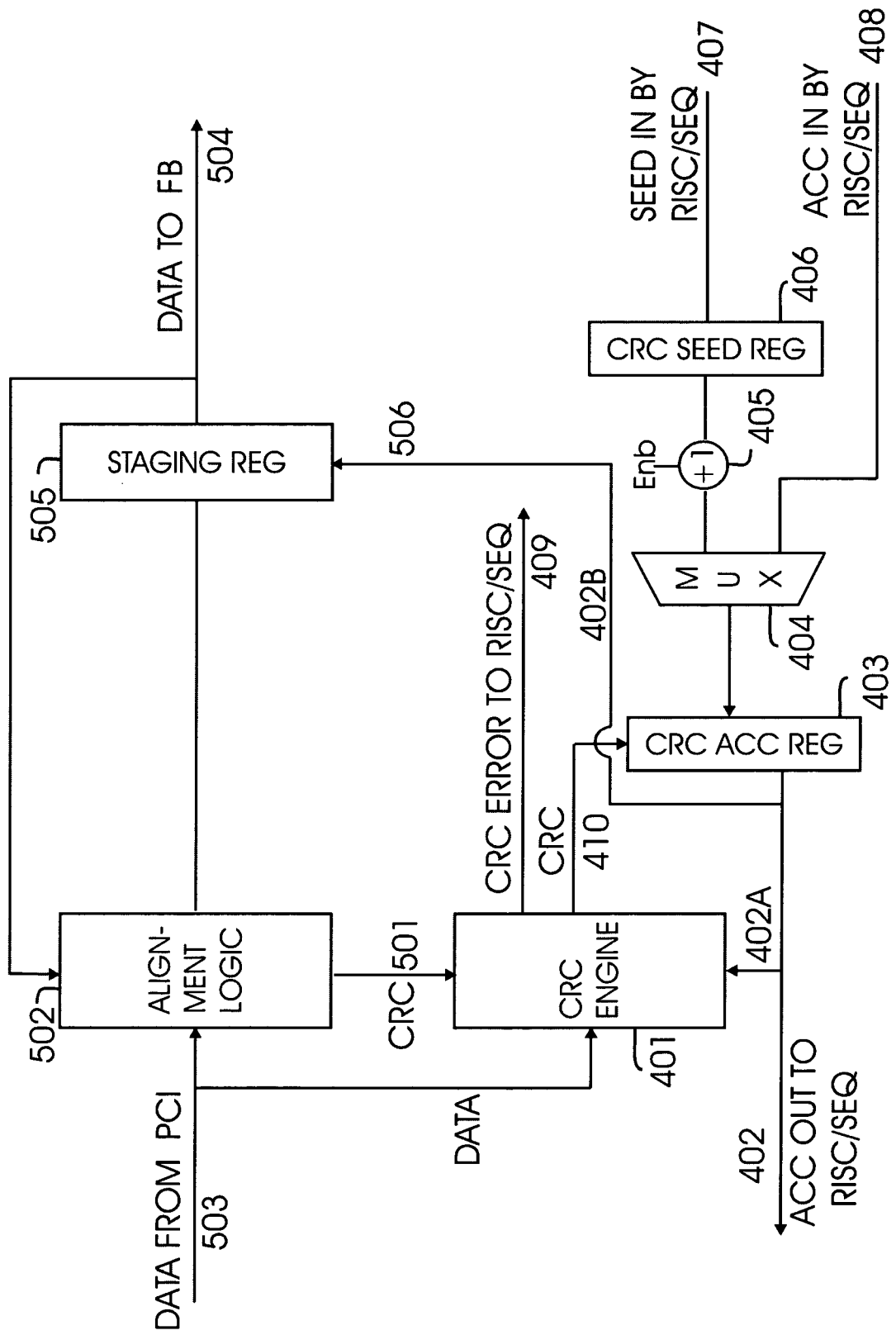
FIG. 5 is a flow diagram of a system performing data integrity checks in the transmit path, according to one aspect of the present invention.

FIG. 5 shows a block diagram for the transmit path, when data 503 comes from PCI bus 105 and is sent to FB 308. The CRC process/modes, described above are applicable in the transmit path as well.

The foregoing adaptive aspects of the present invention are implemented using plural registers in RDMA module 306 and TDMA module 305. The register values are accessible by processors 109 and 112. FIGS. 7A and 7B show the various register values that are used during a receive (from FB 308) and transmit (from PCI bus 105) operation.

It is noteworthy that the present invention can be used in compliance with the iSCSI standard and performs the data integrity process steps on iSCSI protocol data units ("PDUs").

Figure 6:
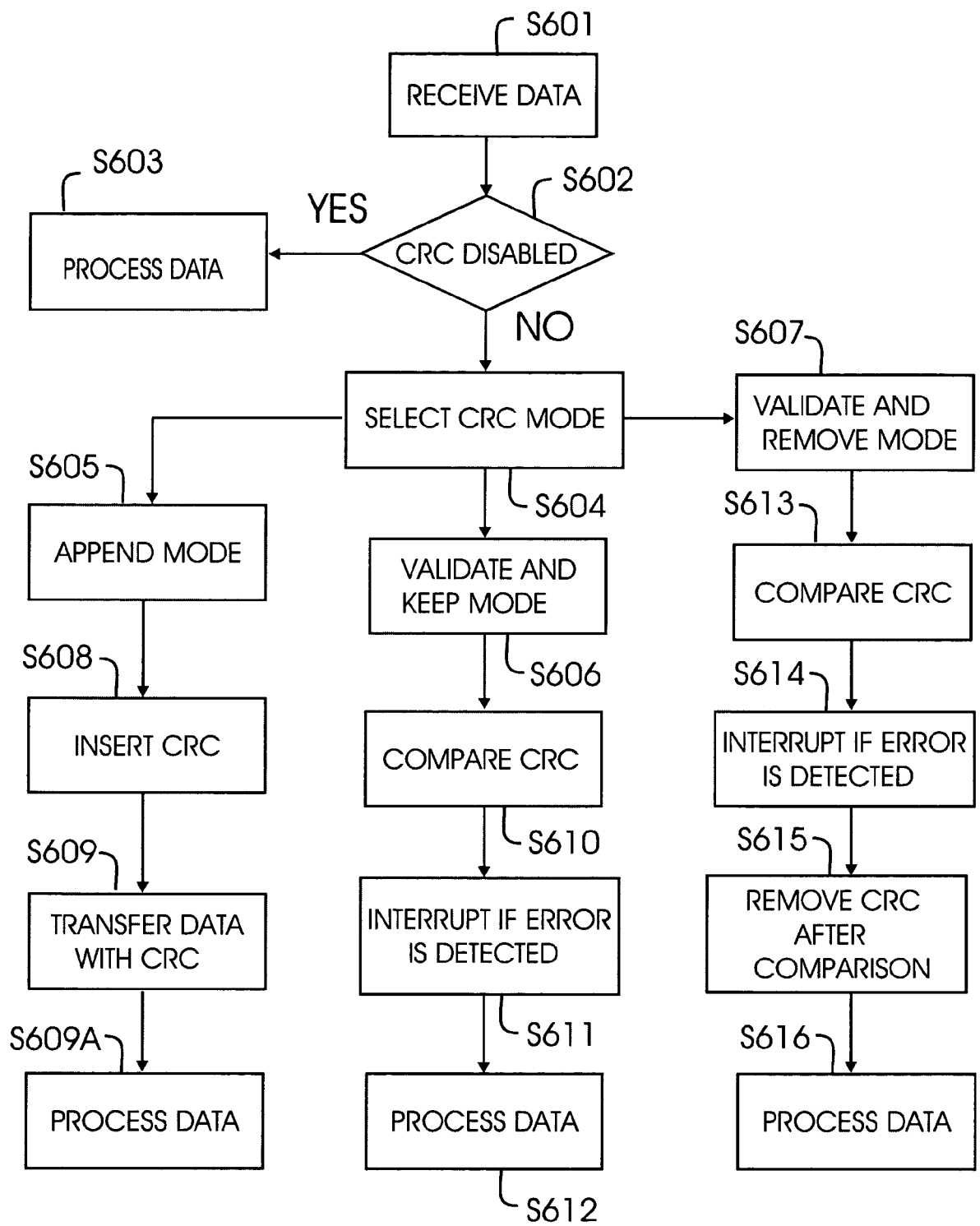
FIG. 6 is a flow diagram of executable process steps for performing data integrity tests, according to one aspect of the present invention.

FIG. 6 shows a flow diagram of executable process steps for performing data integrity steps, according to one aspect of the present invention.

In step S601, the process receives data. Data may be received from FB 308 (receive path) or from PCI 105 (transmit path). In step S602, the process determines if CRC is disabled (See Bit 6 in FIGS. 7A and 7B). If CRC mode is not enabled, the process sends data in step S603.

If the CRC mode is enabled, then the process selects a particular mode, namely, Append, Validate & Keep, and Validate and remove mode. The modes may be selected by firmware using the plural bits shown in FIGS. 7A and 7B.

If the Append mode is selected, then in step S608, CRC is inserted after each data block boundary, as described above, and then data is sent in step S609 and processed in step S609A.

If the Validate & Keep mode is selected, then in step S610, CRC is compared, as described above. If an error is found, then an interrupt is sent in step S611 and thereafter, CRC is sent with the data in step S612.

If the Validate & Remove mode is selected, then in step S613, the process compares the CRC. If an error is detected, then an interrupt is generated in step S614. In step S615 the process removes the CRC after comparison and data is processed in step S616.

Although the present invention has been described with reference to specific embodiments, these embodiments are illustrative only and not limiting. Many other applications and embodiments of the present invention will be apparent in light of this disclosure and the following claims.

What is claimed is:

1. A method for managing data integrity in an adapter, comprising:
   receiving data in a receive and/or transmit path;
   determining if a cyclic redundancy code ("CRC") mode is enabled; and
   selecting a CRC mode from among plural modes including append mode, validate and keep mode, and validate and remove mode; wherein if the append mode is selected, then CRC is appended after each data block boundary.

2. The method of claim 1, wherein adapter firmware code may be used to select a particular mode based on certain register bits.

3. The method of claim 1, wherein if the validate and keep mode is selected, then CRC accompanying any data is compared to accumulated CRC in real time while data is being sent to a host system and if an error occurs after the comparison, an interrupt is generated and data with CRC from a storage system are sent to the host system.

4. The method of claim 1, wherein if the validate and remove mode is selected, then CRC is first validated and then CRC is removed before data is sent, without involving a host system or a storage system and any errors are reported to an adapter processor.

5. The method of claim 1, wherein during an increment mode CRC seed value is incremented for each data block providing a unique CRC value for each data block.

6. The method of claim 5, wherein an optional field and CRC are sent with a data block and the optional field is used to insert custom information.

7. A system for managing data integrity in receive and transmit path of an adapter, comprising:
   a processor executing firmware code for selecting one of plural modes for implementing cyclic redundancy code ("CRC") including append mode, validate and keep mode, and validate and remove mode, wherein during append mode, a CRC engine determines CRC for each data block and CRC seed value is incremented for each data block such that each data block has a unique CRC value.

8. The system of claim 7, wherein register bits are used for enabling and disabling the plural modes for implementing CRC.

9. The system of claim 7, wherein during the append mode each data block is associated with an optional field for inserting custom information.

10. The system of claim 7, wherein during the validate and keep mode, a CRC engine compares CRC for data with accumulated CRC information in real time while data is being sent to a host system.

11. The system of claim 10, wherein an interrupt is generated if an error occurs after the comparison and CRC received from a storage system in a receive path is sent to the host system.

12. The system of claim 7, wherein during the validate and remove mode, CRC is validated and then CRC information is removed before data is sent without involving a host system or a storage system.

13. An adapter in a redundant array of independent disks ("RAID") controller that is coupled to a host system and a storage media, comprising:
  a processor executing firmware code for selecting one of plural modes for implementing cyclic redundancy code ("CRC"),wherein the plural CRC modes include append mode, validate and keep mode, and validate and remove mode and during the append mode, a CRC engine determines CRC for each data block and CRC seed value is incremented for each data block such that each data block has a unique CRC value.

14. The adapter of claim 13, wherein register bits are used for enabling and disabling the plural modes for implementing CRC.

15. The adapter of claim 13, wherein during the append mode each data block is associated with an optional field which is used for inserting custom information.

16. The adapter of claim 13, wherein during the validate and keep mode, a CRC engine compares CRC for data with accumulated CRC information in real time while data is being sent to the host system.

17. The adapter of claim 16, wherein an interrupt is generated if an error occurs after the comparison and CRC received from the storage system is sent to the host system.

18. The adapter of claim 13, wherein during the validate and remove mode, CRC is validated and CRC information is removed before data is sent without involving the host system or the storage system.

19. The adapter of claim 13, wherein the adapter is coupled to the host system via a PCI and/or PCI-X interface.

* * * * *

UNITED STATES PATENT AND TRADEMARK OFFICE
CERTIFICATE OF CORRECTION

| | | |
|---|---|---|
| PATENT NO. | : 7,234,101 B1 | Page 1 of 1 |
| APPLICATION NO. | : 10/674943 | |
| DATED | : June 19, 2007 | |
| INVENTOR(S) | : Dharma R. Konda et al. | |

It is certified that error appears in the above-identified patent and that said Letters Patent is hereby corrected as shown below:

On the Title page, in field (75), in column 1, under "Inventors", line 2-3,
delete "Huntingdon Beach," and insert -- Huntington Beach, --, therefor.

Signed and Sealed this

Ninth Day of November, 2010

David J. Kappos
*Director of the United States Patent and Trademark Office*